United States Patent
Kelley et al.

(10) Patent No.: US 7,496,958 B2
(45) Date of Patent: Feb. 24, 2009

(54) SYSTEM FOR SELECTIVELY ENABLING OPERATING MODES OF A DEVICE

(75) Inventors: Brian Harold Kelley, San Diego, CA (US); Ramesh Chandrasekhar, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 272 days.

(21) Appl. No.: 10/697,354

(22) Filed: Oct. 29, 2003

(65) Prior Publication Data

US 2005/0097345 A1 May 5, 2005

(51) Int. Cl.
G06F 21/22 (2006.01)
G06F 9/00 (2006.01)

(52) U.S. Cl. .................. 726/17; 726/29; 713/1
(58) Field of Classification Search .......... 713/166
See application file for complete search history.

(56) References Cited

U.S. PATENT DOCUMENTS

| | | | | |
|---|---|---|---|---|
| 5,402,492 A * | 3/1995 | Goodman et al. | ........... | 726/20 |
| 5,442,704 A * | 8/1995 | Holtey | ........... | 711/163 |
| 5,446,864 A * | 8/1995 | Burghardt et al. | ........... | 711/100 |
| 6,268,789 B1 * | 7/2001 | Diamant et al. | ........... | 340/5.74 |
| 6,363,463 B1 * | 3/2002 | Mattison | ........... | 711/164 |
| 6,507,904 B1 * | 1/2003 | Ellison et al. | ........... | 712/229 |
| 6,651,171 B1 * | 11/2003 | England et al. | ........... | 713/193 |
| 6,795,905 B1 * | 9/2004 | Ellison et al. | ........... | 711/163 |
| 6,925,570 B2 * | 8/2005 | Freeman et al. | ........... | 713/192 |
| 6,938,164 B1 * | 8/2005 | England et al. | ........... | 713/193 |
| 6,941,458 B1 * | 9/2005 | Ellison et al. | ........... | 713/164 |
| 7,082,507 B1 * | 7/2006 | Christie et al. | ........... | 711/163 |
| 7,130,951 B1 * | 10/2006 | Christie et al. | ........... | 710/261 |
| 2002/0095572 A1 * | 7/2002 | Frank et al. | ........... | 713/166 |
| 2003/0014667 A1 * | 1/2003 | Kolichtchak | ........... | 713/201 |
| 2003/0159056 A1 * | 8/2003 | Cromer et al. | ........... | 713/193 |
| 2003/0188173 A1 * | 10/2003 | Zimmer et al. | ........... | 713/189 |
| 2003/0226014 A1 * | 12/2003 | Schmidt et al. | ........... | 713/164 |
| 2003/0229794 A1 * | 12/2003 | Sutton et al. | ........... | 713/189 |
| 2004/0205353 A1 * | 10/2004 | Catherman et al. | ........... | 713/200 |
| 2004/0210764 A1 * | 10/2004 | McGrath et al. | ........... | 713/200 |

OTHER PUBLICATIONS

Kranjac McIntosh, S. NTDR Infosec: software security and the 80486 microprocessor 21st Century Military Communications Conference Proceedings (MILCOM 2000). Oct. 22-25, 2000, vol. 2, pp. 1042-1048.

Goldberg R P: "Survey of Virtual Machine Research" Computer, IEEE Service Center, Los Alamitos, CA US, vol. 7, No. 6, Jun. 1974, pp. 34-45, XP009043730 ISSN: 0018-9162 (p. 34-p. 37, left-hand column*.

* cited by examiner

Primary Examiner—Christopher A Revak
(74) Attorney, Agent, or Firm—James T. Hagler; Robert J. O'Connell; Thomas Rouse

(57) ABSTRACT

System for selectively enabling operating modes of a device. The system includes a method for selectively enabling operating modes of a device during a device initialization, wherein the operating modes comprise a privileged mode and a non-privileged mode. The method includes determining during the device initialization whether the device is to operate in the privileged mode or in both the privileged and non-privileged modes, and enabling the privileged mode if it is determined that the device is to operate only in the privileged mode. The method also includes enabling both the privileged and the non-privileged modes if it is determined that the device is to operate in both the privileged and the non-privileged modes.

15 Claims, 3 Drawing Sheets

SYSTEM FOR SELECTIVELY ENABLING OPERATING MODES OF A DEVICE

BACKGROUND

I. Field

The present invention relates generally to the efficient operation of a device, and more particularly, to a system for selectively enabling operating modes of a device.

II. Description of the Related Art

Advances in technology have resulted in the development of a variety of devices for home, office, and personal use. For example, computer systems, such as desktops, notebooks, and tablet computers have become powerful tools for use at home or in office environments. Personal devices, such as wireless telephones, personal digital assistants (PDAs), and paging devices have also become more powerful and are now widely used.

Many devices now comprise complex hardware and software that run operating systems such as UNIX, LINUX, or similar operating systems. Generally, these operating systems provide for multiple modes of operation. For example, most systems provide privileged and non-privileged modes of operation. Programs executing in the privileged mode of operation are allowed to access memory and system resources without limitation. Programs executing in the non-privileged mode are restricted from accessing certain memory regions and/or device systems. This configuration provides a level of protection to important memory or device functions. For example, by executing third-party applications in the non-privileged mode, important memory regions and device functions can be protected from unauthorized access. Also, such an arrangement allows the system to isolate faults during execution.

In systems without multiple modes of operation, there need be no concern for protecting the integrity of privileged mode, and existing software is not structured in a way to accommodate a proper division between privileged and non-privileged operation. Software written in this manner is incompatible within a system that supports privileged and non-privileged modes of operation.

These compatibility issues complicate the task of moving a large body of software from a system that does not support multiple modes of execution to a system that does. The software as a whole cannot be tested intact until all the pieces have been migrated to the multi-mode model.

Therefore, what is needed is a system that supports multiple modes of operation and can optionally run software in one mode of operation without change to the software. In such a system, applications can be executed and tested with older software while they are being converted to support multiple modes of operation.

SUMMARY

In one or more embodiments, a system comprising methods and/or apparatus is provided that allows operating modes of a device to be selectively enabled. For example, in one embodiment, a mechanism is provided that allows the selection of operating modes to occur during a device initialization process, and as a result, the operating mode selection does not have to be compiled into the executable program that runs on the device.

In one or more embodiments, a non-volatile flag is used to determine the selected operating modes of the device. For example, the flag resides in non-volatile memory and may only be set or cleared by the device manufacturer or other authorized personnel. During device initialization, the flag is tested to determine the selected operating mode of the device.

In one embodiment, a method is provided for selectively enabling operating modes of a device during a device initialization, wherein the operating modes comprise a privileged mode and a non-privileged mode. The method comprises determining during the device initialization whether the device is to operate in the privileged mode or in both the privileged and non-privileged modes, and enabling the privileged mode if it is determined that the device is to operate only in the privileged mode. The method also comprises enabling both the privileged and the non-privileged modes if it is determined that the device is to operate in both the privileged and the non-privileged modes.

In another embodiment, apparatus is provided for selectively enabling operating modes of a device during a device initialization, wherein the operating modes comprise a privileged mode and a non-privileged mode. The apparatus comprises a flag and selection logic that operates to read the flag to set the operating mode of the device, wherein if the flag is set the selection logic enables the privileged mode, and if the flag is not set, the selection logic enables both the privileged and non-privileged modes.

In another embodiment, apparatus is provided for selectively enabling operating modes of a device during a device initialization, wherein the operating modes comprise a privileged mode and a non-privileged mode. The apparatus comprises means for determining during the device initialization whether the device is to operate in the privileged mode or in both the privileged and non-privileged modes. The apparatus also comprises means for enabling only the privileged mode if it is determined that the device is to operate only in the privileged mode. The apparatus also comprises means for enabling both the privileged and the non-privileged modes if it is determined that the device is to operate in both the privileged and the non-privileged modes.

In another embodiment, a computer-readable media is provided comprising instructions, which when executed by a processor in a device, operate to selectively enable operating modes of a device during a device initialization, wherein the operating modes comprise a privileged mode and a non-privileged mode. The computer-readable media comprises instructions for determining during the device initialization whether the device is to operate in the privileged mode or in both the privileged and non-privileged modes. The computer-readable media also comprises instructions for enabling only the privileged mode if it is determined that the device is to operate only in the privileged mode. The computer-readable media also comprises instructions for enabling both the privileged and the non-privileged modes if it is determined that the device is to operate in both the privileged and the non-privileged modes.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes an operating mode selection system that allows operating modes of a device to be selectively enabled.

In one or more embodiments, the selection system interacts with a runtime environment (or operating system) executing on the device that is used to simplify operation of the device, such as by providing generalized calls for device specific resources. One such runtime environment is the Binary Runtime Environment for Wireless™ (BREW™) software platform developed by QUALCOMM, Inc., of San Diego, Calif. The following description describes a device executing a runtime environment, such as the BREW software platform. However, in one or more embodiments, the registration system is suitable for use with other types of runtime environments to provide fast and efficient registration of privileged function hooks in a variety of devices, including generating systems or other controlling or monitoring programs. For example, the devices may include, but are not limited to, desktop computers, notebook computers, handheld computers, and portable devices, such as wireless telephones, pagers, PDAs, email devices, tablet computers, or other type of computing devices.

Figure 1:
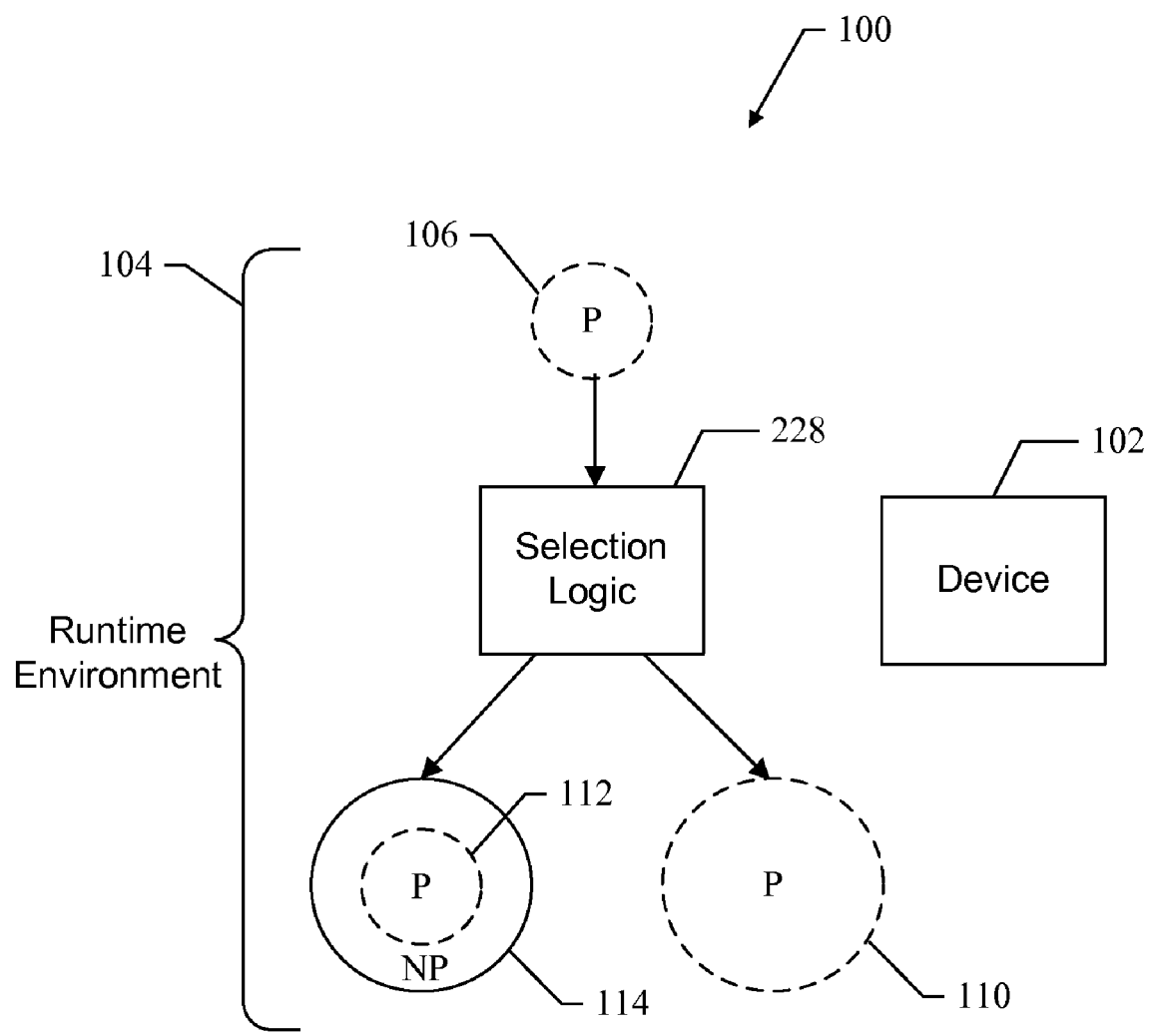
FIG. 1 shows a device that includes one embodiment of an operating mode selection system.

FIG. 1 shows one embodiment of an operating mode selection system 100 that operates to allow operating modes of a device 102 to be selectively enabled. The system 100 may be part of a home computer, office computer, or personal device, such as a wireless telephone or PDA, or any other type of computing device.

In one embodiment, the device 102 includes a runtime environment 104 (i.e., BREW) that provides at least two modes of operation; namely a non-privileged mode (NP) and a privileged mode (P). The non-privilege mode of operation is used to restrict the access of applications running on the device and to provide fault detection. For example, applications running in non-privileged mode are restricted to selected memory regions and may be denied access to device registers or other resources. The privileged mode of operation allows applications running under this mode to access memory or device resources without limitation.

During system initialization, the device begins operating in the privileged mode 106. In one embodiment, selection logic 228 executes to selectively enable operating modes of the device 102. The selection logic 228 determines if the device 102 is to operate in the privileged mode only, as shown at 110, or if the device 102 is to operate with both privileged and non-privileged modes, as shown by 112 and 114, respectively.

Because the selection logic 228 operates during system initialization, it is possible to easily change the operating mode configuration of the device without having to compile a new executable. Thus, the selection system is well suited for use during system development and testing because operating mode selection can be performed through a simple mechanism that is fast and easy to use.

Figure 2:
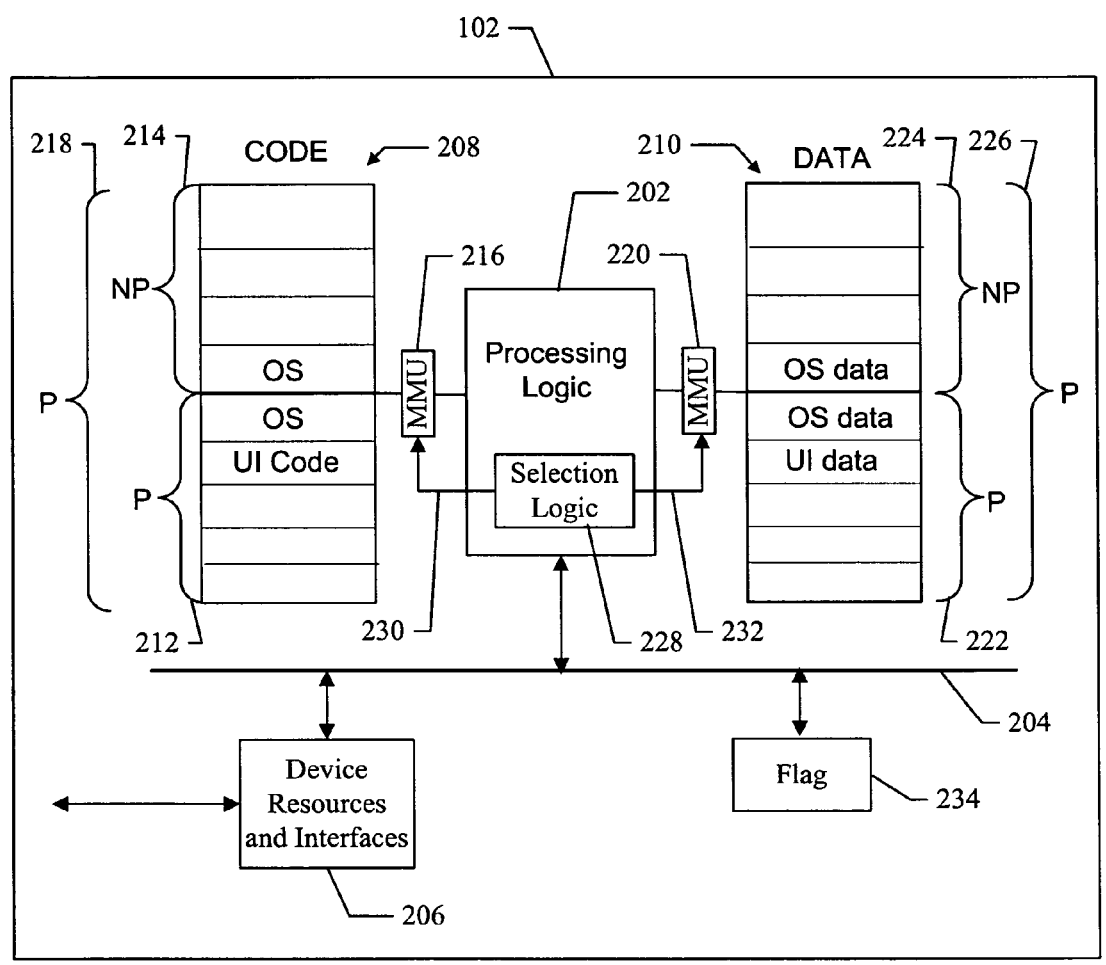
FIG. 2 shows a functional block diagram of a device comprising one embodiment of an operating mode selection system.

FIG. 2 shows a functional block diagram of the device 102 comprising one embodiment of an operating mode selection system. The device 102 comprises processing logic 202, device resources 206, and a non-volatile memory 234 that are coupled to an internal data bus 204. The device resources 206 comprise hardware, software, memory, logic, and/or other resources that allow the device to interface to various internal and external resources, devices, or systems. Also coupled to the processing logic 202 are code memory 208 and data memory 210.

In one or more embodiments, the processing logic 202 comprises a CPU, processor, gate array, hardware logic, memory elements, virtual machine, software, I/O interfaces, and/or any combination of hardware and software. Thus, the processing logic 202 generally comprises logic to execute machine-readable instructions. For example, instructions may be loaded into the device 102 from a computer-readable media, such as a floppy disk, CDROM, Flash memory, or other computer-readable media that interfaces to the device 102 via the device resources 206. In another embodiment, the instructions may be downloaded into the device 102 from a network resource, such as a network server or any other type of network resource that interfaces to the device 102 via the device resources 206. The instructions, when executed by the processing logic 202, provide one or more embodiments of an operating mode selection system as described herein.

In one embodiment, code memory 208 comprises RAM, ROM, FLASH, EEROM, or any other suitable type of memory, or a combination thereof. A first memory management unit (MMU) 216 is coupled to the processing logic 202 and the code memory 208. The MMU 216 operates to partition the code memory 206 into any combination of a privileged region (P) 212 and a non-privileged region (NP) 214. For example, the MMU 216 may partition the code memory into a single privileged partition 218, or into both non-privileged 214 and privileged 212 partitions. When the non-privileged partition 214 is used, the MMU 216 operates to restrict the operation of non-privileged program code so that the non-privileged code has limited access rights to selected regions of the code memory 208.

In one embodiment, the data memory 210 comprises RAM, ROM, FLASH, EEROM, or any other suitable type of memory, or a combination thereof. A second memory management unit (MMU) 220 is coupled to the processing logic 202 and the data memory 210. The MMU 220 operates to partition the data memory 206 into any combination of a privileged region (P) 222 and a non-privileged region (NP) 224. For example, the MMU 220 may partition the data memory into a single privileged partition 226, or into both non-privileged 224 and privileged 222 partitions. When the non-privileged partition 224 is used, the MMU 220 operates to restrict the operation of non-privileged program code so that the non-privileged code has limited access rights to selected regions of the data memory 210.

The device 102 also includes selection logic 228 that, in one embodiment, is part of the processing logic 202. For example, the selection logic 228 may comprise the processing logic 202 executing selected program instructions stored in the code memory 208. The selection logic 228 operates to selectively control the MMUs 216 and 220. For example, the selection logic 228 controls the operation of the MMU 216 via the control line 230. The selection logic 228 also controls the operation of the MMU 220 via the control line 232. Therefore, operation of the selection logic 228 can be used to selectively enable operating modes of the device 102.

The non-volatile memory 234 is used to store a flag that indicates the selected operating modes for the device. In one embodiment, the flag is protected so that only the device manufacturer or other authorized personnel can set or clear the flag. For example, a system integrator may access the memory 234 to set or clear the flag by using a system integration tool.

During initialization, the selection logic 228 accesses the memory 234 to read the flag. The selection logic 228 then uses the flag to enable the operating mode of the device 102. For example, in one embodiment, the flag is set high, and the selection system enables only the privileged mode of operation. This is accomplished by the selection logic 228 controlling both the MMUs 216 and 220. In another embodiment, the flag is set low, and the selection system enables both privileged and non-privileged modes. This is also accomplished by the selection logic 228 controlling both the MMUs 216 and 220.

In one embodiment, the described mode selection system comprises program instructions stored on a computer-readable media, which when executed by the processing logic 202, provides the functions described herein. In one or more embodiments, the computer-readable media comprises a floppy disk, CD, memory card, FLASH memory device, RAM, ROM, or any other type of memory device.

Figure 3:
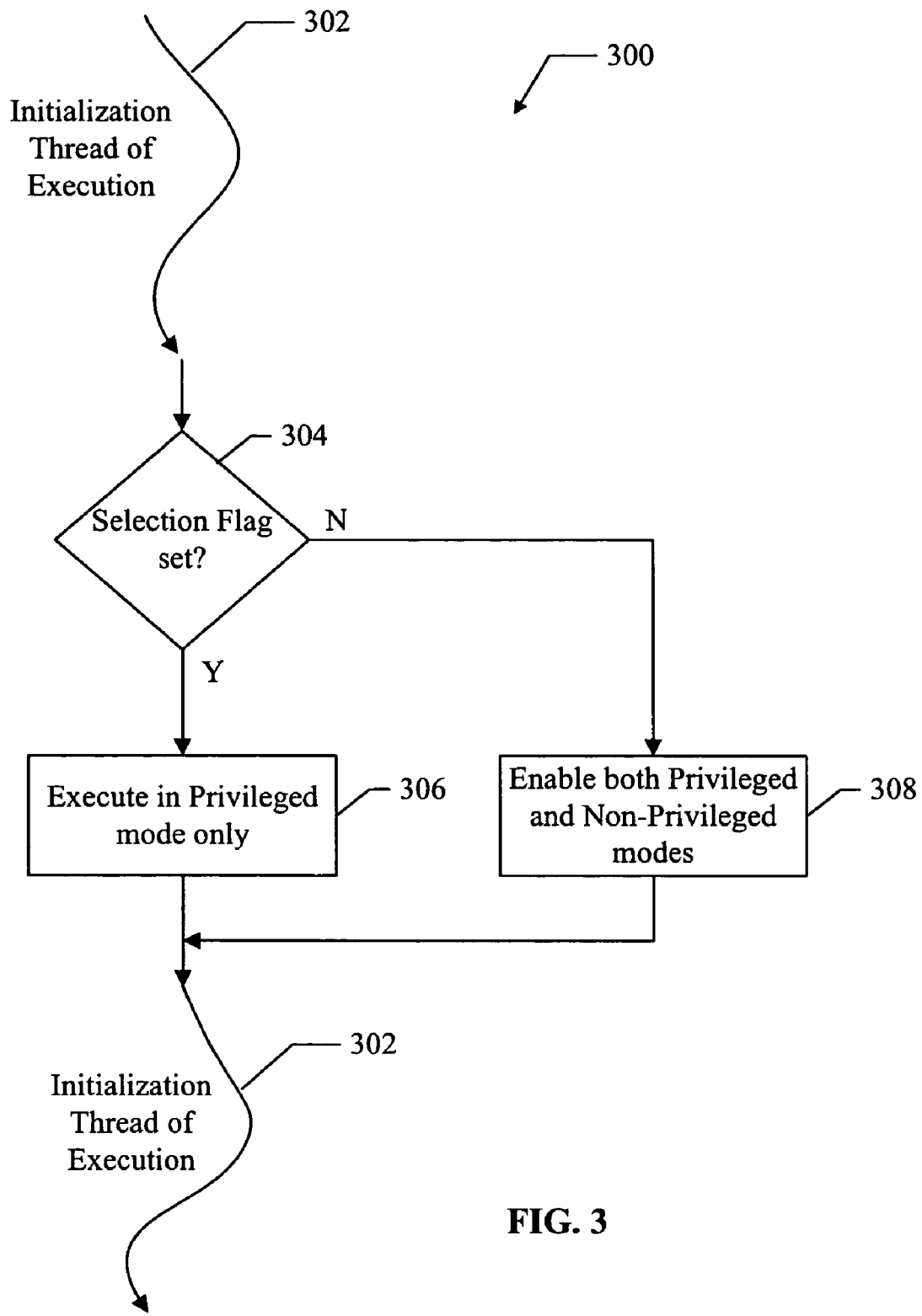
FIG. 3 shows a flow diagram that illustrates the operation of one embodiment of an operating mode selection system for use in a device.

FIG. 3 shows a flow diagram 300 that illustrates the operation of one embodiment of an operating mode selection system for use in a device, for example the device 102. For clarity, the flow diagram 300 will be described with reference to the device 102 shown in FIG. 2. It will be assumed that the device is executing a BREW runtime environment and that the processing logic 202 executes program instructions stored in the code memory 208 to perform the functions described below.

During operation, an initialization thread of execution 302 is created that represents the initialization of the device 102.

At block 304, a test is performed to determine what operating modes are to be enabled on the device. For example, in one embodiment, the test comprises the selection logic 228 reading the flag in the memory 234 to determine the selected operation mode. If the selection flag is set high, the method proceeds to block 306. If the selection flag is not set high, the method proceeds to block 308.

At block 306, the operating mode is selected so that the device operates in only the privileged mode. To enable only the privileged mode, the selection logic 228 controls the MMUs 216 and 220, via the control lines 230 and 232, respectively.

At block 308, the operating mode is selected so that the device operates in both the privileged and non-privileged operating mode. To enable both modes, the selection logic 228 controls the MMUs 216 and 220, via the control lines 230 and 232, respectively. After the mode of the device is selected, the method continues the initialization thread of execution 302.

It should be noted that the program flow diagram 300 illustrates just one embodiment and that changes, additions, or rearrangements of the flow elements may be made without deviating from the scope of the invention.

Accordingly, while one or more embodiments of methods and/or apparatus for an operating mode selection system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

I claim:

1. A method for selectively enabling operating modes of a device during a device initialization, wherein the operating modes comprise a privileged mode and a non-privileged mode, and the method comprising:

determining during the device initialization whether the device is to operate either in the privileged mode or in both the privileged and non-privileged modes; and enabling the privileged mode if it is determined that the device is to operate only in the privileged mode; and enabling both the privileged and the non-privileged modes if it is determined that the device is to operate in both the privileged and the non-privileged modes, wherein programs operating in the privileged mode have unlimited access to device memory and/or device functions and programs operating in the non-privileged mode have limited access to device memory and/or device functions.

2. The method of claim 1, wherein the step of determining comprises testing a flag.

3. The method of claim 1, wherein the step of enabling only the privileged mode comprises controlling one or more device memory management units to enable only the privileged mode.

4. The method of claim 1, wherein the step of enabling both the privileged mode and the non-privileged modes comprises controlling one or more device memory management units to enable both modes.

5. The method of claim 1, wherein the device is a wireless device.

6. Apparatus for selectively enabling operating modes of a device during a device initialization, wherein the operating modes comprise a privileged mode and a non-privileged mode, and the apparatus comprising:

means for determining during the device initialization whether the device is to operate either in the privileged mode or in both the privileged and non-privileged modes; and means for enabling only the privileged mode if it is determined that the device is to operate only in the privileged mode; and means for enabling both the privileged and the non-privileged modes if it is determined that the device is to operate in both the privileged and the non-privileged modes, wherein programs operating in the privileged mode have unlimited access to device memory and/or device functions and programs operating in the non-privileged mode have limited access to device memory and/or device functions.

7. The apparatus of claim 6, wherein the means for determining comprises means for testing a flag.

8. The apparatus of claim 6, wherein the means for enabling the only privileged mode comprises means for controlling one or more device memory management units to enable only the privileged mode.

9. The apparatus of claim 6, wherein the means for enabling both the privileged mode and the non-privileged modes comprises means for controlling one or more device memory management units to enable both modes.

10. The apparatus of claim 6, wherein the device is a wireless device.

11. A computer-readable media comprising instructions, which when executed by a processor in a device, operate to selectively enable operating modes of a device during a device initialization, wherein the operating modes comprise a privileged mode and a non-privileged mode, and the computer-readable media comprising:

instructions for determining during the device initialization whether the device is to operate either in the privileged mode or in both the privileged and non-privileged modes; and instructions for enabling only the privileged mode if it is determined that the device is to operate only in the privileged mode; and instructions for enabling both the privileged and the non-privileged modes if it is determined that the device is to operate in both the privileged and the non-privileged modes, wherein programs operating in the privileged mode have unlimited access to device memory and/or device functions and programs operating in the non-privileged mode have limited access to device memory and/or device functions.

12. The computer-readable media of claim 11, wherein the instructions for determining comprise instructions for testing a flag.

13. The computer-readable media of claim 11, wherein the instructions for enabling the only privileged mode comprise instructions for controlling one or more device memory management units to enable only the privileged mode.

14. The computer-readable media of claim 11, wherein the instructions for enabling both the privileged mode and the non-privileged modes comprise instructions for controlling one or more device memory management units to enable both modes.

15. The computer-readable media of claim 11, wherein the device is a wireless device.

* * * * *